United States Patent [19]
McCoy

[11] Patent Number: 5,219,243
[45] Date of Patent: Jun. 15, 1993

[54] METHOD AND APPARATUS FOR THE HYDROLOGIC REGULATION OF TURF SOIL PROFILES

[75] Inventor: Edward L. McCoy, Wooster, Ohio

[73] Assignee: The Ohio State University, Columbus, Ohio

[21] Appl. No.: 901,931

[22] Filed: Jun. 22, 1992

[51] Int. Cl.[5] .................... E02B 11/00; E02B 13/00
[52] U.S. Cl. ...................................... 405/43; 405/36; 405/45
[58] Field of Search ................. 405/36, 37, 39-48, 405/50, 52

[56] References Cited

U.S. PATENT DOCUMENTS

| | | |
|---|---|---|
| 1,083,148 | 12/1913 | Sparks . |
| 1,224,692 | 5/1917 | Tucker . |
| 1,638,862 | 8/1927 | Lott . |
| 1,904,001 | 4/1933 | Kimmel . |
| 2,067,356 | 1/1937 | Swinhoe . |
| 2,075,590 | 3/1937 | North . |
| 2,127,175 | 8/1938 | Imbertson et al. . |
| 2,578,981 | 12/1951 | Parker . |
| 2,768,028 | 10/1956 | Robinson . |
| 2,786,418 | 3/1957 | Peck . |
| 2,947,109 | 8/1960 | Davis, Sr. et al. . |
| 3,024,372 | 3/1962 | Seele . |
| 3,307,360 | 3/1967 | Bailly . |
| 3,461,675 | 8/1969 | Izatt . |
| 3,908,385 | 9/1975 | Daniel et al. . |
| 4,260,283 | 4/1981 | Croy ................................... 405/36 |
| 4,268,993 | 5/1981 | Cunningham ................... 405/37 X |
| 4,704,047 | 11/1987 | Oldfelt et al. ........................ 405/37 |
| 4,881,846 | 11/1989 | Burkstaller ......................... 405/37 |
| 5,064,308 | 11/1991 | Almond et al. ................ 405/36 X |

Primary Examiner—Dennis L. Taylor
Attorney, Agent, or Firm—Calfee, Halter & Griswold

[57] ABSTRACT

The hydrology of a "perched water table" soil profile is regulated by installing a simple subsurface air-pipe system in the gravel layer of the soil profile to uniformly control the air pressure under the turf and to adjust the equilibrium condition between the capillary rise and the gravitational forces on the water in the soil. The air pipe system includes perforated pipes extending horizontally through the gravel layer of the soil profile at regular, spaced-apart intervals. The pipes are located adjacent the gravel layer/choker layer interface in vertical alignment with each drain pipe in the water drainpipe trench(es). The pipes are oriented such that the perforations extend along one (or both) sides of the pipe. A vacuum is applied to the pipes and the air is withdrawn uniformly across the gravel layer and the choker layer. According to one aspect of the invention, the air pressure difference across the rootzone acts as an additional force assisting gravity in the extraction of water from the rootzone. According to another aspect of the invention, sub-atmospheric pressure in the gravel layer is provided by the air pipes to increase the driving force of the water through the soil.

15 Claims, 2 Drawing Sheets

U.S. Patent June 15, 1993 Sheet 1 of 2 5,219,243
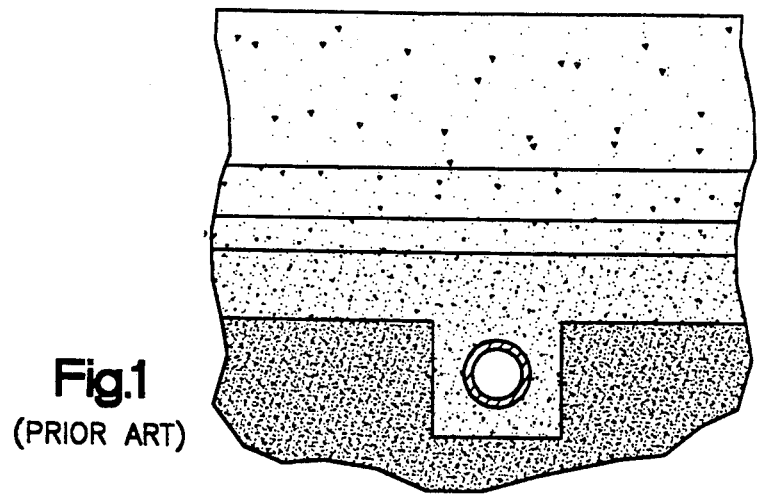
Fig.1
(PRIOR ART)
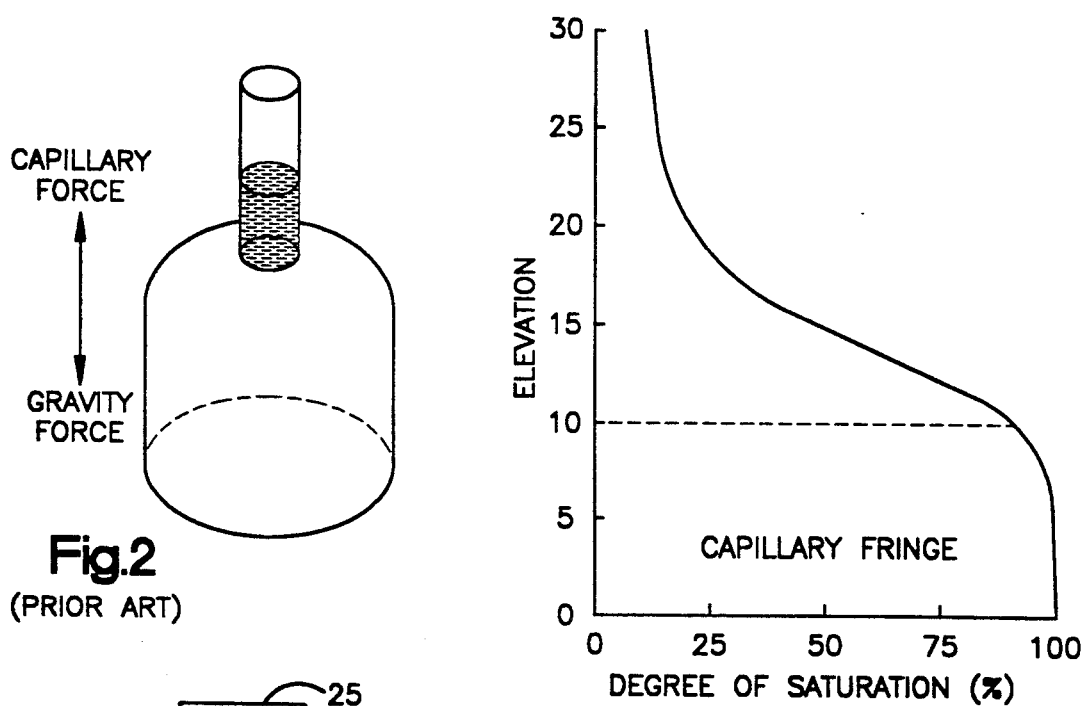
Fig.2
(PRIOR ART)
Fig.3
(PRIOR ART)
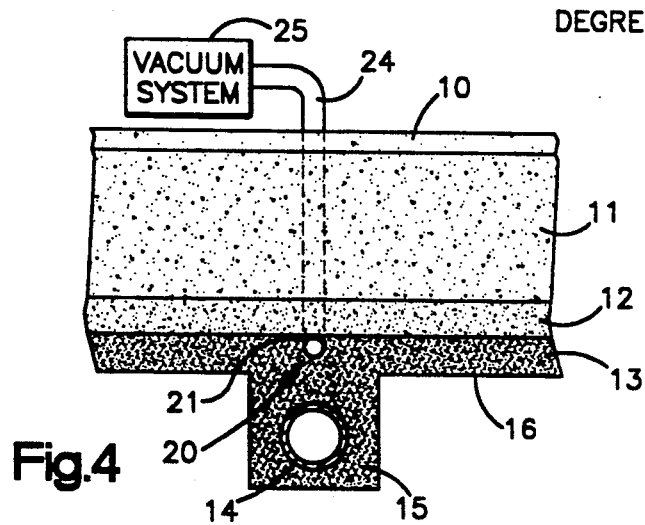
Fig.4

METHOD AND APPARATUS FOR THE HYDROLOGIC REGULATION OF TURF SOIL PROFILES

FIELD OF THE INVENTION

The present invention relates generally to the hydrologic regulation of turf soil profiles.

BACKGROUND OF INVENTION

The "perched water table" soil profile design as currently employed in U.S. Golf Association specifications on putting greens, some natural turf athletic fields, and some turf race courses consists of a sand-based rootzone soil mix underlain by a gravel drainage blanket, and a thin, coarse sand interface between the rootzone and the gravel layer which is termed the "choker layer". One or more drain pipes extend in trench(es) formed in the gravel drainage blanket to collect water and direct the water to a remote drain, creek or pond. An example of such a soil profile is illustrated in FIG. 1.

In this soil profile design, a "perched water table" (also referred to as a "capillary fringe") is created in the lower portion of the rootzone. The "perched water table" is the zone of saturated or nearly saturated soil in the lower portion of the rootzone due to the large particle size differences between the rootzone mix components and the choker layer. The formation of a "perched water table" in this soil profile represents an equilibrium hydrologic condition that occurs at some time after excess rainfall or irrigation water has drained from the soil profile. In this equilibrium condition, the gravitational forces attempting to drain water from the rootzone are balanced by capillary forces retaining water in the rootzone mix. This equilibrium condition is illustrated by a capillary tube model shown in FIG. 2. The purpose in creating this "perched water table" is to provide a reservoir of water in the lower layers of the soil profile for subsequent uptake by the turf growing on the soil surface.

In typical applications, the rootzone soil mix will extend downwardly from the turf layer about 12-14 inches (31-36 cm), the sand interface will extend downwardly from the rootzone about 1-2 inches (2.5-5.0 cm), and the drainage blanket will extend downwardly a further 4-5 inches (10.25-13.00 cm). The width of the capillary fringe is equal to the capillary rise from the textural difference interface into the rootzone. The degree of soil saturation as a function of elevation above the choker layer is illustrated in FIG. 3.

The extent of capillary rise in the soil is dictated by the pore size distribution of the rootzone mix. The pore size distribution is primarily influenced by the size of the sand and/or soil particles making up the mix. Generally, a rootzone mix composed of relatively smaller particles creates a higher capillary rise, and vice versa (see, e.g., Table 1).

TABLE 1

| Height of Capillary Rise for Different Soil Materials (From Bear, 1972) | |
|---|---|
| Material | Capillary Rise (cm) |
| Coarse Sand | 2-5 |
| Sand | 12-35 |
| Fine Sand | 35-70 |
| Silt | 70-150 |
| Clay | >200-400 |

However, there can be problems associated with this "perched water table" soil profile design in its current configuration. In particular, if the soil or sand particles in the rootzone mix are too small, the water will perch to an excessively high level in the profile (i.e., the capillary rise will be too large) leading to waterlogging of the roots and turf decline. On the other hand, if the sand or soil particles are too large, the water will perch low in the soil profile (i.e., the capillary rise will be too small) leading to droughty soil conditions requiring more frequent irrigation.

Moreover, often the concern is not so much with the height of capillary rise in the soil profile but rather with the rate of downward water movement through the soil profile. Consider the situation where a heavy rainfall occurs during a football game. To maintain the field in good playing conditions (i.e., not muddy or slippery) the rainfall must quickly infiltrate into the soil. Also, consider the situation of a steady rainfall during PGA tournament play. To avoid the costly cancellation of the round, the rainfall must quickly infiltrate into the soil on the putting greens.

Some systems have been developed to remove excess water from a soil profile. For example, Daniel, et al., U.S. Pat. No. 3,908,385, issued Sep. 30, 1975, shows a subsurface multistrata base and drainage pipe combination designed for vacuum pumping or irrigation. The Daniel system applies a vacuum to the drain pipes to strip rainfall down through the turf and through a uniform porous media between the compacted subsoil and the final grade level. The pipes collect the water and carry the water to an outlet drain. However, vacuum pumping can have drawbacks, namely, a complex (and hence expensive) array of pipes and vacuum equipment to remove the water from the soil.

Another system for removing water is shown in Imbertson, et al., U.S. Pat. No. 2,127,175, issued Aug. 16, 1938. In one embodiment, Imbertson shows a pipe extending vertically downward through the soil wherein the deepest end of the pipe has a perforated portion surrounded by pea gravel. A vacuum is applied to the pipe and air is removed from the voids or spaces between the soil particles, thus drawing water into the soil by gravity and pressure differential. It is believed that the pea gravel surrounding the pipe acts to prevent the soil from clogging the perforations in the pipe during use.

In another embodiment, Imbertson shows perforated pipes extending horizontally through the soil to draw a vacuum below the turf layer. The horizontal pipes remove the air from under the saturated lawn to cause the water to penetrate the soil.

However, the Imbertson system can also have certain drawbacks. In particular, it is believed that the Imbertson air pipe system does not uniformly control the air pressure under a lawn because of the relatively small spaces or voids within the soil which restrict air movement. There can therefore be a large pressure differential only a relatively short distance from each air pipe. Therefore, to provide a sufficient vacuum across the entire lawn can require: (i) a multiplicity of air pipes; and/or (ii) equipment capable of maintaining a strong vacuum. As indicated previously, such systems can be expensive to operate and maintain.

In any case, none of the systems described above provide a simple method and apparatus for the uniform control of air pressure under the turf and for adjusting the equilibrium condition between the capillary rise and the gravitational forces on the water in the soil.

SUMMARY OF THE INVENTION

The present invention provides a new and useful method and apparatus for the hydrologic regulation of turf soil profiles. In particular, the invention regulates the hydrology of a putting green, athletic field or other field having a "perched water table" soil profile by installing a simple subsurface air-pipe system in the gravel layer of the soil profile to uniformly control the air pressure under the turf and to adjust the equilibrium condition between the capillary rise and the gravitational forces on the water in the soil.

The air pipe system of the present invention includes perforated pipes extending horizontally through the gravel layer of the soil profile at regular, spaced-apart intervals. The air pipes are located adjacent the gravel layer/choker layer interface in vertical alignment with each drainpipe in the water drainpipe trench(es). The pipes are oriented such that the perforations extend along one (or both) sides of the pipe. A vacuum is applied to the pipes and the air is withdrawn uniformly across the gravel layer and the choker layer.

According to one aspect of the invention, the air pipes provide sub-atmospheric pressure in the gravel layer beneath the rootzone, so that the air pressure difference across the rootzone acts as an additional force assisting gravity in the extraction of water from the rootzone. The sub-atmospheric pressure is substantially uniform across the gravel layer by virtue of the flow of air between the interstices or pores in the gravel layer. Since the air flows freely through the gravel layer, the number of pipes, perforations in the pipes, and vacuum equipment can be kept to a minimum.

By creating a sub-atmospheric pressure in the gravel layer, a reduction in the height of capillary rise occurs in the rootzone equal to the air pressure difference. This reduction in capillary rise can be adjusted by varying the sub-atmospheric pressure in the gravel layer such that a new equilibrium condition can be achieved. Accordingly, the extent of capillary rise in the soil profile can be regulated to a desired level such that droughty and oversaturated conditions are prevented.

According to another aspect of the invention, sub-atmospheric pressure in the gravel layer is provided by the air pipes to increase the driving force of the water through the soil. The driving force of the water will therefore be a combination of both the gravitational forces on the water and the subatmospheric pressure created by the air pipe system. The increased driving force can speed water removal after e.g., a rainstorm.

It is therefore one object of the present invention to provide a simple method and apparatus for regulating the water content in soil profiles, and in particular a "perched water table" soil profile, which prevents droughty or saturated conditions occurring in the turf layer of a putting green, athletic field, or other field where drainage is necessary or desired, and which speeds water drainage through the field after a rainstorm.

It is another object of the present invention to uniformly control the air pressure under the turf and to adjust the equilibrium condition between the capillary rise and the gravitational forces on the water in the soil.

It is yet another object of the present invention to provide an air pipe system which can be easily installed either during installation of a "perched water table" soil profile, or subsequent to such installation, and which regulates the hydrologic profile of the soil profile by application of a relatively small, uniform vacuum to the gravel layer of the soil profile.

Further objects of the present invention will become apparent from the following detailed description and accompanying drawings.

BRIEF DESCRIPTION OF THE DRAWINGS

FIG. 1 is a schematic illustration of a perched water table soil profile;

FIG. 2 is a schematic illustration of a prior art capillary tube model for the equilibrium hydrologic condition in the perched water table soil profile;

FIG. 3 is a prior art graph illustrating the degree of soil saturation as a function of elevation;

FIG. 4 is a schematic illustration of a vacuum system constructed according to the principles of the present invention in a putting green soil profile;

DETAILED DESCRIPTION OF THE DRAWINGS

Figure 5:
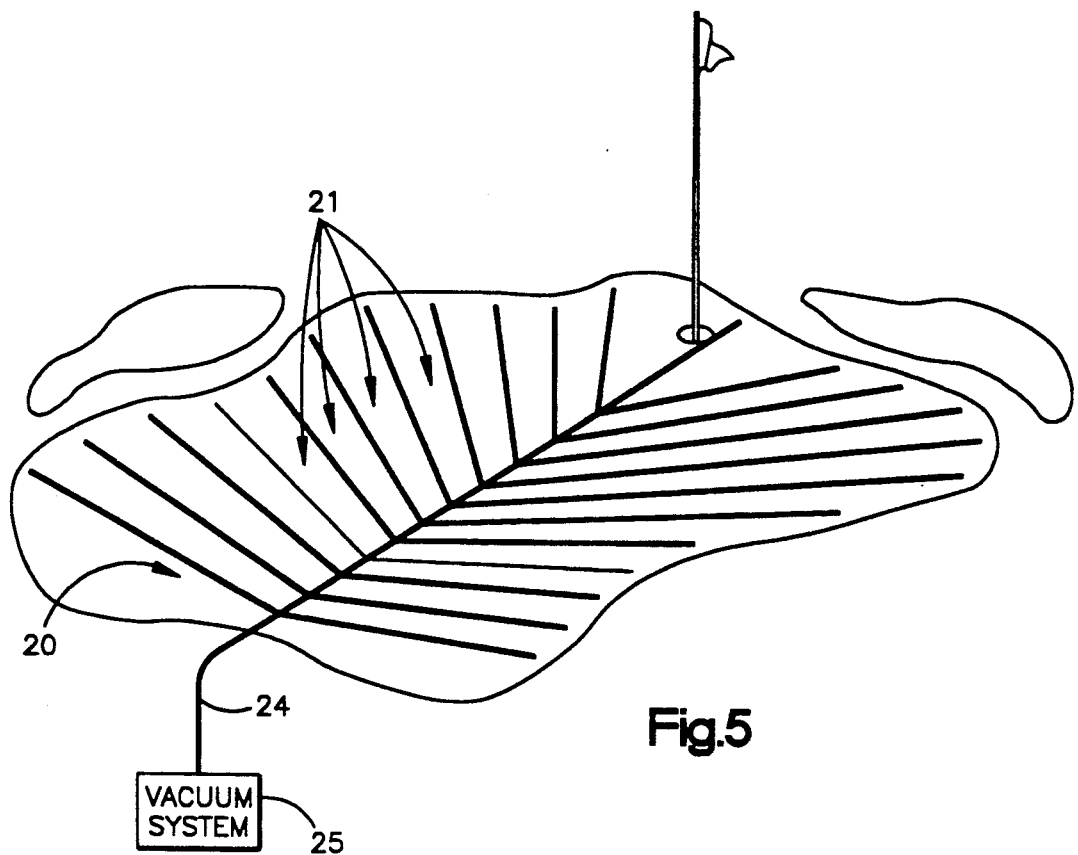
FIG. 5 is a schematic elevated illustration of the vacuum system installed in a putting green.

Referring to the drawings, and initially to FIG. 4, a soil profile for a putting green is illustrated. The soil profile is preferably a conventional "perched water table" soil profile having an upper turf layer 10, a rootzone layer 11 of finely textured soil, a choker layer 12 of coarse sand, and a coarse gravel layer 13 of pea gravel. One or more perforated water drainpipes 14 extend horizontally in trenches 15 below the gravel layer 14. The drainpipes are typically spaced so that the water flowing to a water drainpipe trench does not need to flow more than ten feet to reach a drainpipe. The drainpipes are connected at one end to an outlet pipe leading to a remote drain, pond or creek (not shown). Finally, a plastic liner 16 lines the bottom of the gravel layer and the drainpipe trench.

It should become apparent to those skilled in the art that the above-described soil profile is only exemplary in nature, and that the present invention can also be used other soil profiles which have an upper saturated (or nearly saturated) layer and a lower gravel layer or other layer with relatively large particles (as compared to soil which has relatively small particles) underlying the upper layer. For example, another type of "perched water table" soil profile which would benefit from the present invention could have a lower gravel layer, a choker layer overlying the gravel layer, a rootzone layer overlying the choker layer, and an upper layer of a plant species other than turf. Such a soil profile could be used in growing crops in a greenhouse, for example. Accordingly, the term "turf layer" is intended to encompass other such upper layers.

Figure 6:
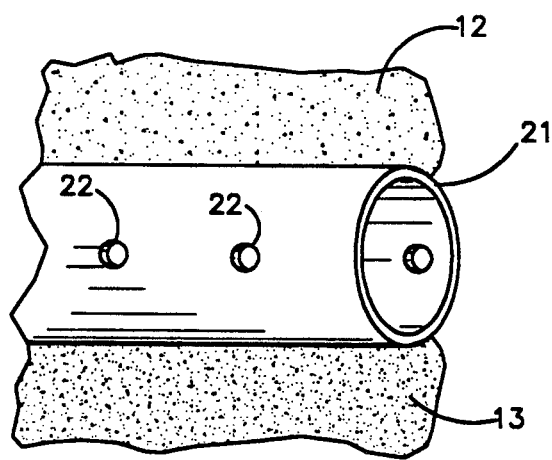
FIG. 6 is a partial side view of an air pipe for the vacuum system of the present invention.

The hydrology of the soil profile(s) described above is regulated by installing a subsurface air-pipe system, indicated generally at 20. The air pipe system includes a plurality of air pipes 21 extending horizontally through the gravel layer 13 at regular, spaced-apart intervals (see e.g., FIG. 5). Each air pipe is preferably located in vertical alignment with a respective drainpipe in the water drainpipe trench 15 (i.e., one air pipe exteding in vertical alignment with each drainpipe). Further, each air pipe preferably extends adjacent the gravel layer/choker layer interface, and hence adjacent to the zone of maximum soil saturation. In fact, as shown in FIGS. 4 and 6, the upper edge of each pipe can even contact the interface between the gravel layer 13 and choker layer 12. Such a location is preferable because the air pipes are at a point which is farthest away from any water in the drainpipe trench. The air pipes are thus in a good position to create and control the pressure differential across the turf soil profile.

The air pipes are preferably formed from 2-inch, crush resistant tubing, such as PVC tubing. Each pipe includes perforations 22 which preferably extend along both sides of the pipe in parallel or staggered relation along the length of the pipe (approximately 4" apart from each other), but can also be located on only one side of the pipe. The location of the perforations along the side(s) of the pipe prevents water from draining directly into the pipes such as if the perforations were located along the top or bottom of the pipe. The composition and diameter of the piping, and the number and location of perforations in the pipe can vary in relation to the number of pipes used, desired vacuum, and other factors which should be apparent to those skilled in the art. However, as will be described herein in more detail, the number of pipes, perforations in the pipes, diameter, etc., can all be kept to a minimum because of the unique location of the air pipes in the gravel layer of the soil profile.

One outlet of each air-pipe is connected by piping 24 to a vacuum system, indicated schematically at 25, while the other end of each air pipe is closed. The vacuum system is a conventional vacuum system capable of maintaining approximately 2-5 psi subatmospheric pressure in the gravel layer. In any case, the vacuum system should have the capability to provide sufficient air flow through the gravel layer so that any air permeating the rootzone mix from the atmosphere is rapidly removed and pressure control is maintained. It is anticipated that this air flow will be small since the soil directly above the gravel layer is saturated with water and creates an air seal.

During hydrologic regulation of the soil profile, the outlets of the water drainpipes are closed by e.g., valves (not shown), and the vacuum is applied to the air-pipe system. The vacuum is readily transmitted through the unsaturated gravel layer and into the choker layer to establish the desired sub-atmospheric pressure below the rootzone layer. Even though the choker layer is composed of course sand with relatively smaller pores and spaces than gravel, the relative thinness of the choker layer allows the air to flow through in a uniform manner. As water percolates from the rootzone down through the choker layer because of the pressure differential, the water will collect in the gravel layer. However, the air pipes remain substantially free from water because of the location of the air pipes above the water drainpipe trenches, the large pores and spaces between the gravel particles in the gravel layer, and the location of the perforations along the sides of the air pipes.

Water will eventually collect in the bottom of the gravel layer and rise to the level of the air-pipe system. Once water reaches the air-pipe system, appropriate sensors, water traps, etc. can deactivate the vacuum, and the valves in the water drainage system can be opened to allow the excess water to rapidly drain from the profile. Once the water drainage system is opened, the air-pipe system is opened to the atmosphere to allow air entry into the gravel layer from above to assist water drainage. The air pipe system could also be pressurized at this point with a positive pressure to force the water out through the water drainpipe.

The system could be operated in two different modes depending upon the hydrologic objective desired. In the first mode, control of the height of capillary rise can be achieved. In this case, following rainfall or irrigation, a small vacuum is applied to the air-pipe system outlet such that a sub-atmospheric pressure of approximately 10-20 cm of water is attained in the gravel layer (where 10 cm of water is approximately equal to 0.15 psi). For example, an air pressure difference of $-10$ cm of water will lower the capillary rise by 10 cm. This level of vacuum is held until the equilibrium condition is established.

In the second mode of operation, increased water infiltration and drainage through the rootzone layer is achieved. The downward flow of water through soil in the absence of a sub-atmospheric pressure is driven by the gravitational term of the total hydraulic head gradient, i.e.:

$$q = -k \, (\Delta h_g / \Delta z),$$

where q is the water flux [cm$^3$ H$_2$O/cm$^2$ area-sec], k is the soil hydraulic conductivity [cm/sec ], and $\Delta h_g/\Delta z$ is the gravitational hydraulic head gradient [cm/cm ].

If, however, a gradient of air pressure is established across the rootzone in the soil profile under consideration, where the air pressure is atmospheric at the surface and sub-atmospheric in the gravel layer, then there will be an additional driving force for water flow resulting from this air pressure difference; i.e.:

$$q = -k \, [(\Delta h_g/\Delta z) + (\Delta h_p/\Delta z)]$$

where $\Delta h_p/\Delta z$ is the air pressure difference across the rootzone layer.

Thus, in a "perched water table" soil profile design, the creation of a sub-atmospheric air pressure below the rootzone will speed water flow through the soil due to the increased driving force. Indeed, it has been determined that only a modest sub-atmospheric pressure is needed to substantially increase the driving force. For example, for a 30 cm rootzone layer, the gravitational gradient across this layer is equal to 1.0 cm/cm. Application of a 30 cm (of water) sub-atmospheric pressure in the gravel layer will create an air pressure difference across this layer equal to 1.0 cm/cm, effectively doubling the driving force for water flow. Application of a 60 cm (of water) sub-atmospheric pressure in the gravel layer will create an air pressure difference across this layer equal to 2.0 cm/cm, bringing the total driving force to 3.0 cm/cm, and so on. This substantial increase in the driving force will subsequently speed water movement through the soil.

As the profile dries, the air flow will approach the maximum air flow capacity of the vacuum system. At this point, the vacuum applied to the gravel layer will necessarily fall. This, however, will not substantially affect the performance of the invention since by the time air flows through the profile in sufficient quantity to effect the applied vacuum, the desired goal of removing excess water from the profile will be attained. If, however, there is subsequent rainfall on the soil surface while the vacuum system is on, then the air flow will decrease and the sub-atmospheric pressure will again rise to speed this subsequent rainfall through the profile.

To control the activation and deactivation of the vacuum pump, sensors can be located in the soil, and in particular in the perched water table, to determine the degree of soil saturation and necessary corrective measures. These sensors typically act as a resistance variable load with the effective resistance varying in a known manner depending upon the moisture present. Examples of such sensors are described in Daniel, et al., U.S. Pat. No. 3,908,385; Seele, U.S. Pat. No. 3,024,372; Parker, U.S. Pat. No. 2,578,981; and Robinson, U.S. Pat. No. 2,768,028.

The above-described concepts were demonstrated by constructing a perched water table soil profile in the laboratory. The profile consisted of a 28 cm (after compaction and settling) rootzone layer overlying a 2 cm coarse sand (fine gravel) choker layer with a 9 cm gravel drainage blanket. The profile was constructed as a cylindrical column contained within a 31.5 cm diameter clear plastic vessel.

A water drainage tube was connected to an opening in the base of the vessel to provide water drainage from the gravel layer. In addition, a stopcock was connected to this tube to open or close the drainpipe. An additional tube was connected to an opening in the side of the vessel located 8 cm from the base and 1 cm below the choker layer interface. This tube was connected to the vacuum system to allow creation of a sub-atmospheric pressure in the gravel layer.

In this manner, a sub-atmospheric pressure was applied to the gravel layer at the base of the profile. In addition, the appropriate combination of a manometer, rotameter, and vacuum regulator were connected between the soil profile and the vacuum supply to regulate the sub-atmospheric pressure and measure air flow through the soil. The rootzone mixture was composed of commercial 80% sand:20% peat mixture with sieve analysis as follows:

| Sieve Opening (mm) | % Retained (wt) |
|---|---|
| 2.0 | 2.0 |
| 1.0 | 3.5 |
| 0.5 | 21.3 |
| 0.25 | 51.5 |
| 0.05 | 21.3 |
| pan | 0.4 |

The choker layer was also a commercial fine gravel (⅛ to ¼ inch), and the gravel drainage blanket was composed of ½ to ¼ inch pea gravel.

After constructing and settling the profile, the profile was saturated with water by slowly raising the water table from below through the drainage tube until the entire profile was water saturated. At this point, water was added to the soil surface until a ponding over the profile of 3 cm depth was established. The time required for this water level to drop 2.5 cm under the influence of gravity alone (sub-atmospheric pressure=0) was recorded. This process was repeated with the application of 20, 40, and 60 cm of sub-atmospheric pressure applied to the gravel layer. Note, the drain tube valve was closed during application of the vacuum to the gravel layer to allow maintenance of the vacuum pressure in the gravel layer. The results of this demonstration are given in Table 2 below.

The demonstration shows how application of subatmospheric pressure to the gravel layer can speed water movement through the soil profile, such as after a rainfall.

TABLE 2

| Time Required for a 3 cm Ponding Above the Profile to Drop to a Level of 0.5 cm Above the Profile as a Function of Vacuum Pressure (Sub-Atmospheric) Applied to Gravel Layer | |
|---|---|
| Vacuum (cm H$_2$O) | Time |
| 0 | 51 min, 25 sec |
| 20 | 42 min |
| 40 | 31 min, 25 sec |
| 60 | 23 min, 45 sec |

Subsequently, the vacuum pressure was released and the profile was allowed to drain overnight under the influence of gravity alone. The next morning, an obvious perched water table was created in the rootzone and water drainage from the system had ceased.

With the soil profile in this configuration (perched water table, and drainage under gravity stopped), a sub-atmospheric pressure of 20 cm was applied to the gravel drainage blanket. At this point, water began to drain from the rootzone and collect in the lower levels of the gravel layer. Note, the drainpipe was closed to eliminate air entry into the gravel layer so that the vacuum could be maintained. In addition, there was a visually apparent lowering of the level of the capillary fringe in the soil profile. After several hours, the system at 20 cm vacuum appeared to come into equilibrium with no further water collecting in the gravel layer and no further lowering of the capillary fringe. At this point, a vacuum of 40 cm was applied to the gravel layer and the above process was repeated with water draining from the rootzone into the gravel layer and a lowering of the capillary fringe.

Accordingly, as described above, the present invention provides a new and useful method and apparatus for the hydrologic regulation of turf soil profiles to prevent drought or saturated conditions from occurring in the turf layer of a putting green, athletic field, or other field where water drainage is necessary or desired.

The principles, preferred embodiments, and modes of operation of the present invention have been described in the foregoing specification. The invention which is intended to be protected herein should not, however, be construed to the particular form described as it is to be regarded as illustrative rather than restrictive. Variations and changes may be made by those skilled in the art without departing from the spirit of the present invention. For example, the air pipes could encircle a putting green to control the air pressure in the gravel layer beneath the green. Installing the pipes around the green which would allow the air pipes to be easily installed after the putting green has been constructed without damaging the turf. Accordingly, the foregoing detailed description should be exemplary in nature and not as limiting as to the scope and spirit of the invention set forth in the appended claims.

What is claimed is:

1. A method for regulating the water content of a soil profile having a turf layer, a rootzone layer under the turf layer, a choker layer under the rootzone layer, a gravel layer under the choker layer and a drainpipe extending in the gravel layer, comprising the steps of:
   providing a perforated air pipe separate from the drainpipe in the gravel layer of the soil profile, closing the drain pipe to atmospheric pressure applying a vacuum to the perforated air pipe such that sub-atmospheric pressure is maintained across a substantial area in the gravel layer.

2. A method as in claim 1, wherein the water in the soil profile has an original equilibrium condition and the sub-atmospheric pressure is maintained in the gravel layer for a time and an amount sufficient to obtain an equilibrium condition of the water in the soil profile which is different than the original equilibrium condition.

3. A method as in claim 1, wherein the vacuum creates an air pressure differential to provide a driving force for the water to draw the water through the rootzone layer.

4. A system for regulating the water content of a multilayer soil profile, comprising: a soil profile having a drainpipe extending horizontally through a gravel layer, a choker layer overlying the gravel layer, a rootzone layer overlying the choker layer, and a turf layer overlying the rootzone layer,:
 a perforated air pipe separate from the drain pipe extending through the gravel layer of the soil profile, and
 a vacuum system connected to the perforated air pipe to maintain sub-atmospheric pressure across a substantial area in the gravel layer.

5. A system as in claim 4, wherein said air pipe extends substantially horizontally through the gravel layer adjacent the choker layer.

6. A method as in claim 5, wherein said air pipe is located in spaced-apart, substantially parallel alignment with the drainpipe.

7. A system as in claim 4, wherein the interface between the rootzone layer and the choker layer is designed to create a perched water table.

8. A system for regulating the water content of a multi-layer soil profile, comprising:
 a soil profile having an upper turf layer, a coarse textured layer having a plurality of horizontally extending drain pipes, and a layer which creates a perched water table interposed between the turf layer and the coarse layer,
 a plurality of perforated air pipes extending through the coarse layer separate from the drain pipes, and
 a vacuum system connected to the perforated air pipes to maintain subatmospheric pressure across a substantially area in the coarse layer.

9. A system as in claim 8, wherein said air pipe extends substantially horizontally through the coarse textured layer.

10. A system as in claim 9, wherein each of said air pipes is located in spaced-apart, substantially parallel alignment with a respective drainpipe.

11. A system as in claim 10, wherein the layer which creates a perched water table includes a choker layer overlying the coarse textured layer, said air pipe extending through the gravel layer adjacent to the choker layer.

12. A method as in claim 1, wherein the water is drawn through the soil profile by the subatmospheric pressure and collects in the gravel layer with the air pipe at least initially remaining substantially free from the water.

13. A method as in claim 12, wherein the subatmospheric pressure is maintained in the gravel layer for a period of time sufficient to have the water collect in the gravel layer up to the level of the air pipe, at which point the vacuum is discontinued and the drain pipe is opened to atmospheric pressure to allow the water to drain out through the drain pipe.

14. A system as in claim 4, wherein said gravel layer is comprised of particles at least 0.25 inches (6.4 mm) in size.

15. A system as in claim 11, wherein said coarse layer is comprised of particles at least 0.25 inches (6.4 mm) in size.

* * * * *

UNITED STATES PATENT AND TRADEMARK OFFICE
CERTIFICATE OF CORRECTION

PATENT NO. : 5,219,243
DATED : June 15, 1993
INVENTOR(S) : McCoy

It is certified that error appears in the above-identified patent and that said Letters Patent is hereby corrected as shown below:

Col. 9, line 20, please delete ":"

Col. 10, line 8, delete "substantially" and insert therefor --substantial--

Signed and Sealed this

First Day of March, 1994

*Attest:*

BRUCE LEHMAN

*Attesting Officer*  Commissioner of Patents and Trademarks